G. ABBOTT.
Corn-Planter.
No. 69,739. Patented Oct. 15, 1867.
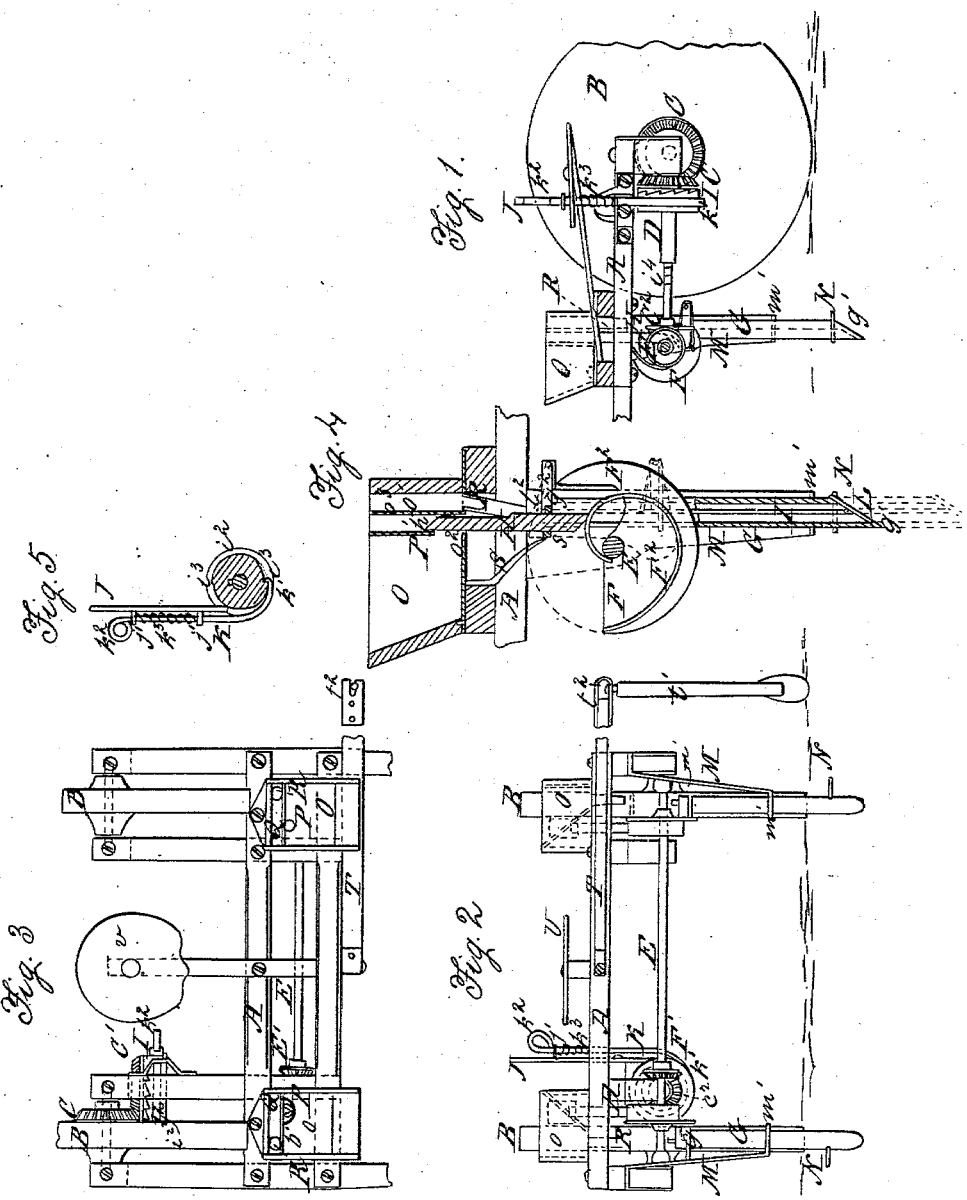

United States Patent Office.

GEORGE ABBOTT, OF WHITE'S CORNERS, NEW YORK.

*Letters Patent No. 69,739, dated October 15, 1867.*

IMPROVEMENT IN CORN-PLANTERS.

*The Schedule referred to in these Letters Patent and making part of the same.*

TO ALL WHOM IT MAY CONCERN:

Be it known that I, GEORGE ABBOTT, of White's Corners, in the county of Erie, and State of New York, have invented a new and improved Corn-Planter; and I do hereby declare that the following is a full and exact description thereof, reference being had to the accompanying drawings, making a part of this specification, in which—

Figure I is a vertical section.
Figure II is a front elevation.
Figure III is a top plan view.
Figure IV is a vertical section of the planting-leg and seed-box, and
Figure V is a vertical section of the clutch-wheel, spring-rod, and changing-lever.

Letters of like name and kind refer to like parts in each of the figures.

The framework of the machine is shown at A, and the driving and supporting wheels at B.

The object of this machine is to plant corn in hills and rows, the hills and rows being uniform and at equal distances apart.

For this purpose a planting-leg, which is represented at G, is arranged forward of the wheels, and connected with the gearing in such manner that the leg may be caused to move up by the mechanism, and let fall by its own gravity, and plant hills at intervals and equal distances apart. A bevel cog-wheel is supported upon the axle of the driving-wheel, which is shown at C, and a corresponding bevel-wheel, $C^1$, which meshes therewith, is supported upon the shaft D, and upon the opposite end of this shaft is a smaller bevel-wheel, $C^2$, which meshes with the corresponding bevel-wheel $E'$ on the shaft E, and upon each end of the shaft E is a compound cam, $F F^1 F^2$, which is so constructed as to lift the planting-legs at the proper time, as hereinafter more fully described. Upon the shaft D is placed a movable clutch, I, which engages with the clutch-teeth formed on the opposite face of the bevel-wheel $C^1$. This clutch has a sleeve, $D'$, which slides upon the shaft, and the clutch is held in gear by means of the coil spring $i^4$. The clutch is moved out and in gear at pleasure by the driver by means of the clutch-lever J. There is also connected with the clutch a spring-rod, K, having a hook, $k^1$, on the end thereof, which may engage with recessed notches $i^3$ formed in the clutch, which, when the clutch is thrown out of gear, will enable the driver to move the distributing apparatus and set it at any given point in advance of the driving-wheels, and thereby insure the planting of the hills at the proper points at the commencement of the rows, or in passing any obstruction which may be found in the field. The spring $k^5$ is intended to hold the clutch out of contact with the recessed notches in the clutch. By this arrangement the driver has complete command of the planting apparatus, so that he can stop and start the mechanism or advance it at pleasure, in order to insure the planting of a hill at any required spot or place. The planting-leg is a round tube, having its entering end bevelled upon one side, as shown in the drawings. It has a vertical movement, and is supported by the hangers M, which hangers have projecting knees $m'$ through which the leg moves. Upon the upper end of the leg is a cog projection, $g^2$, against which the outer cam $F^1$ works in a manner to lift the leg to its highest position and release it at the proper time, and let it fall by its own gravity, by which fall it enters the ground a sufficient depth for the planting of the hill. There is also placed within the lower end of the leg a valve, L, which is connected with the valve-rod $l^1$, which passes up the leg and connects with the short lever $l^2$, which lever is pivoted to the cog projection $g^2$ in such manner as that the cam will strike it and open the valve at the proper time to drop the seed which is in the leg into the hole made by the entering end of the leg just at the time the leg commences its upward movement. Both planting-legs have the same movements, and at the same time. Upon the lower end of the leg is a flat projecting piece, N, which is called a hill-marker. This also limits the distance the leg enters the ground, and leaves its mark upon the surface of the ground, so that the driver can see it and determine exactly where the hills are planted, and so that he can guide the machine and form straight and uniform parallel rows. The uniform and equal movements of the planting-legs, with the control which the driver has over the machine by means of the clutch-wheel, spring-rod, and lever, shown in Fig. V, will insure straight cross-rows, or "rows both ways." The seed-box is represented at O. It has a partition, $O^1$, which partition has a shield, P. A hole or opening is made through the partition, through which the seed-carrier drops the seed for each hill. H is a seed-carrier, which picks up from the seed-box a requisite number of kernels for a hill, and carries them up, passing within the shield, and dropping them through the hole $O^3$ in the partition, and on to the incline Q, which directs the kernels into the tube R, and thence into the planting-leg. The seed-carrier passes through a slot or mortise, $O^2$, in the bottom of the hopper, and through a like mortise in the brace s, and is supported thereby. The movements of all the parts are so regulated that the planting-leg is at its highest position just at the proper time to receive the kernels for each hill as they pass down the incline and through the short tube R. U represents the driver's seat. T $t^1$ represent a guide, which overhangs the machine, and projects from the machine just the width between the rows, so that the pendant will hang over the row last planted, and thereby enable the driver to direct the machine so as to place the rows being planted at the proper distance from the rows last planted. The pendant $t^1$ is connected with the projecting bar T by means of a slotted swivel-joint, $t^2$, by which the pendant may be moved from one side to the other of the bar T, and have at either side a free swinging movement.

The machine herein described is easily drawn by one horse. It may be constructed much larger by lengthening the frame A and shaft E, and adding one or two more distributing apparatuses, in which case two horses would be required.

What I claim as my invention, and desire to secure by Letters Patent, is—

1. The clutch I and spring-rod K, in combination and arrangement with the gearing and planting apparatus of a corn-planting machine, for the purposes and substantially as described.

2. The planting-leg G, connected with the driving-wheel by means of appropriate gearing in such manner that the leg may be caused to move up by the mechanism, and let fall by its own gravity, and plant hills at intervals, substantially as set forth.

3. The seed-gatherer H, arranged with the seed-box O, partition $O^1$, and tube R, for the purpose of picking up and carrying the requisite number of kernels to form a hill, and depositing the same in the planting-leg, substantially as described.

4. The valve L, placed at the foot of the planting-leg, and operated by means of the rod $l^1$, lever $l^2$, and cam $F^1$, for the purpose and substantially as described.

5. The spring-rod K, operating upon the clutch-wheel I to advance or set the planting gear, substantially as set forth.

6. The hill-marker or projection N near the foot of the planting-leg G, by which each hill is individually marked, substantially as set forth.

7. The shield P, placed in the seed-box around the feed-slide, for the purpose and substantially as described.

8. The cam-wheel F, by which a planting-leg and marker, and a seed-gatherer, either or all, may be operated, for the purpose and substantially as described.

9. The vertical slide or seed-carrier H, arranged with the seed-box O, partition $O^1$, and tube, and operated by the cam $F^2$, for the purposes and substantially as set forth.

10. The slotted swivel-joint $t^2$, as a means of connecting the pendant $t^1$ to the overhanging bar T, for the purpose and substantially as described.

GEO. ABBOTT.

Witnesses:
   B. H. MUEHLE.
   E. B. FORBUSH.